United States Patent

Regterschot et al.

[11] Patent Number: 5,720,837
[45] Date of Patent: Feb. 24, 1998

[54] METHOD FOR ADJUSTING A BELT STRIP ON A CONVEYOR

[75] Inventors: Martinus Regterschot, Wapenveld; Marcus Anthonius Arnoldus Carolus Ter Horst, Berkel en Rodenrijs, both of Netherlands

[73] Assignee: VMI EPE Holland B.V., Gelriaweg, Netherlands

[21] Appl. No.: 510,066

[22] Filed: Aug. 1, 1995

Related U.S. Application Data

[62] Division of Ser. No. 319,395, Oct. 6, 1994, abandoned.

[30] Foreign Application Priority Data

Oct. 6, 1993 [NL] Netherlands ............... 93-01717

[51] Int. Cl.$^6$ ................................................. B29D 30/30
[52] U.S. Cl. ........................... 156/123; 156/133; 156/134; 156/406.4
[58] Field of Search ................... 156/406.4, 405.1, 156/394.1, 110.1, 123, 130, 133, 134; 271/226, 227, 228, 249, 250

[56] References Cited

U.S. PATENT DOCUMENTS

| | | |
|---|---|---|
| 4,359,675 | 11/1982 | Miller, III . |
| 4,411,724 | 10/1983 | Ito et al. ................... 156/304.1 |
| 4,457,802 | 7/1984 | Yanagihara et al. . |
| 4,465,531 | 8/1984 | Araki et al. . |
| 4,545,718 | 10/1985 | Marshall ........................ 414/401 |
| 4,608,890 | 9/1986 | Still et al. . |
| 4,769,104 | 9/1988 | Okuyama et al. . |
| 4,857,123 | 8/1989 | Still et al. ................... 156/405.1 |
| 4,892,609 | 1/1990 | Nakanome et al. ............ 156/406.4 |
| 4,902,372 | 2/1990 | Mick, Jr. et al. ............. 156/406.4 |
| 5,092,946 | 3/1992 | Okuyama et al. ............. 156/406.4 |
| 5,111,722 | 5/1992 | Tada et al. ........................ 83/23 |
| 5,135,601 | 8/1992 | Klose et al. .................. 156/406.4 |
| 5,167,751 | 12/1992 | Shimizu et al. ............... 156/394.1 |
| 5,206,720 | 4/1993 | Clothiaux et al. ............. 156/394.1 |
| 5,271,790 | 12/1993 | Nojiri et al. .................. 156/405.1 |
| 5,389,187 | 2/1995 | Marks et al. ................. 156/405.1 |

FOREIGN PATENT DOCUMENTS

| | | |
|---|---|---|
| 0 104 339 A1 | 4/1984 | European Pat. Off. . |
| 0 125 148 A3 | 11/1984 | European Pat. Off. . |
| 0 376 357 A1 | 7/1990 | European Pat. Off. . |
| 0 430 519 A2 | 6/1991 | European Pat. Off. . |
| 61-237626 | 10/1986 | Japan .......................... 156/406.4 |

*Primary Examiner*—Geoffrey L. Knable
*Attorney, Agent, or Firm*—Pennie & Edmonds, LLP

[57] ABSTRACT

Method for adjusting the shape of at least one side of the circumference of a strip of flexible material to the shape of a reference side concerned. The method comprises the steps of determining the shape of the at least one side of the strip, comparing the shape as determined of the at least one side with the shape of the reference side, and adjusting the shape as determined of the at least one side to the shape of the reference side, depending on the outcome of the comparison. Belt strip feeding apparatus for feeding a belt strip on a rotating building drum. The feeding apparatus is provided with a supply reel for containing belt material, with means for unwinding belt material from the supply reel, with conveying means for conveying the unwound belt material to the building drum, with cutting means placed above the roller conveyor for cutting the belt material into a belt strip. The feeding apparatus comprises means for adjusting at least one side of the belt strip to a reference side concerned, according to the method.

31 Claims, 10 Drawing Sheets

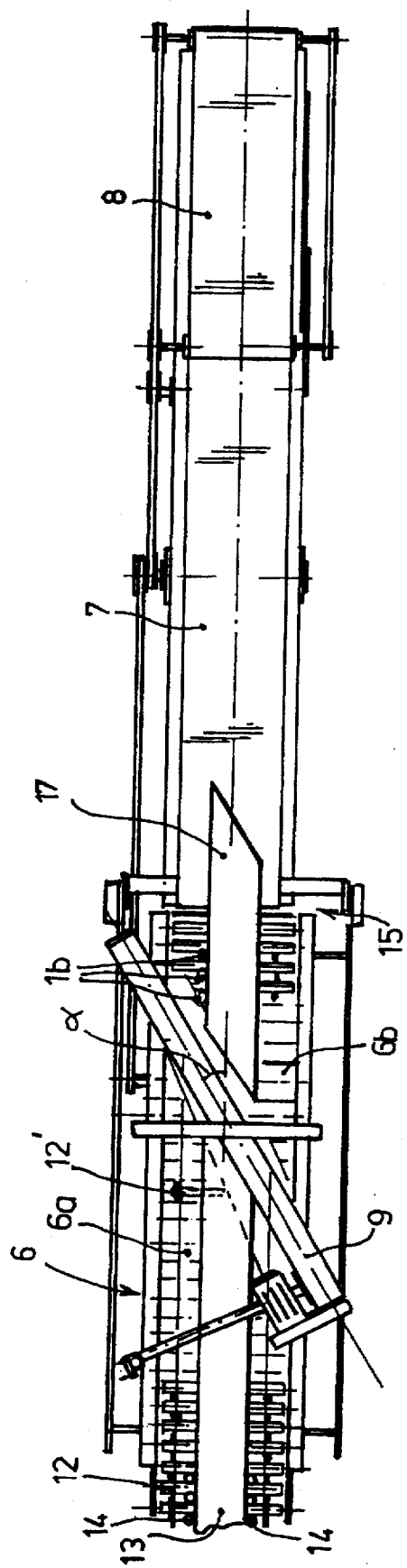
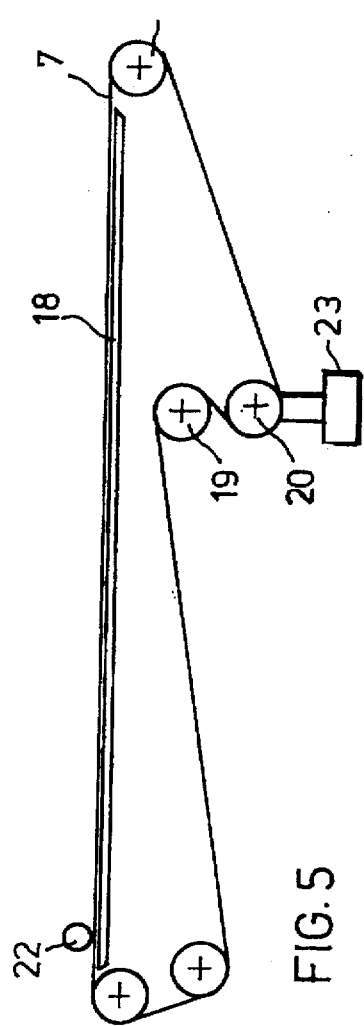
FIG. 4
FIG. 5

METHOD FOR ADJUSTING A BELT STRIP ON A CONVEYOR

This application is a divisional application of U.S. patent application Ser. No. 08/319,395, filed Oct. 6, 1994, now abandoned.

BACKGROUND OF THE INVENTION

The invention relates to a method for adjusting the shape of at least one side of the circumference of a strip of flexible material to the shape of the reference side concerned.

The invention also relates to a belt strip feeding apparatus for feeding a belt strip on a rotating building drum, which feeding apparatus is provided with a supply reel for containing belt material, with means for unwinding the belt material from the supply reel, with conveying means for conveying the unwound belt material to the building drum, successively comprising a roller conveyor, a conveyor belt and a mounting conveyor for mounting the belt strip onto the building drum, with cutting means placed above the roller conveyor for cutting the belt material into a belt strip, such that the belt strip is elongated and has two long circumferential sides and two short circumferential sides and that the strip comprises: a central rectangular part having two long sides and an imaginary centre line, the direction of conveyance of the roller conveyor being parallel to the imaginary centre line, a triangular leading end, situated down-stream, the one short, leading circumferential side of the strip being formed by the hypotenuse of the leading end and a short side of the leading end lying in the extension of one of the long sides of the central part, the hypotenuse and the short side of the leading end enclosing an acute angle and the one long side of the central part and the short side of the leading end forming the one long circumferential side of the strip, a triangular trailing end, situated upstream, the other short, trailing circumferential side of the strip being formed by the hypotenuse of the trailing end and a short side of the trailing end lying in the extension of the other side of the central part, the hypotenuse and the short side of the trailing end enclosing an acute angle and the other long side of the central part and the short side of the trailing end forming the other long circumferential side of the strip.

A method as described in the opening paragraph is known from U.S. patent specification 4,608,890. In the method described in this document, flexible material is cut into strips by means of a cutting mechanism, the front end and the rear end forming an angle with the imaginary centre line of the strip. As a consequence of the variation in angle under which the strip is cut, the angle of the front end and the rear end often differ. In this known method the path of the knife of the cutting mechanism is determined during cutting of the front end and the rear end. The path of the knife as determined during cutting of the rear end is compared with the path of the knife during cutting of the front end. A pivotable manifold is placed on the rear end, said pivotable manifold engaging the rear end. Depending on the difference in the measured paths of the knife, the pivotable manifold together with the rear end is pivoted over the measured angle of difference. Although the aim of this known method is to render the angles of the front and rear end similar, actual practice has shown that rendering the angle equal is not always carried out in a satisfactory manner.

SUMMARY OF THE INVENTION

It is, among other things, an object of the present invention to provide a method for adjusting the shape of at least one side of a strip of flexible material to a reference side, in which this adjustment can be carried out satisfactorily in almost all cases. For this purpose, a method of the type mentioned in the opening paragraph is characterized according to the invention in that the method comprises the steps of determining the shape of the at least one side of the strip, comparing the shape as determined of the at least one side with the shape of the reference side, and adjusting the shape as determined of the at least one side to the shape of the reference side, depending on the outcome of the comparison. The invention is based on the insight that after cutting the front and the rear end of the strip according to the known method, the shape of the end concerned can change as a result of relaxation of tensions in the flexible material. Consequently, the shape of an end of the strip can differ considerably from the determined path of the knife. By determining, according to the invention, the shape of the side of the strip which is to be adjusted itself, the adjustment of this side to a reference side concerned can be carried out more accurately.

Preferably, the at least one side having an adjusted shape is fixed by means of a fixing element. This allows for many adjustments within a certain period of time, in which strips having one or more sides that have already been adjusted, can be stored on the fixing element.

In order to be able to further convey the strip having the at least one adjusted side for further working, an embodiment of a method according to the invention is characterized in that the strip can be conveyed in a direction of conveyance by a conveying means comprising a first conveyor and a second conveyor and in that the at least one side having an adjusted shape is fixed by means of the second conveyor, forming a fixing element, provided with fixing means, the first conveyor conveying the strip to the second conveyor.

When the flexible material contains magnet-sensitive reinforcement cords, for instance steel reinforcement wires, then the at least one side having an adjusted shape is fixed preferably magnetically.

If the material harbours many tensions, it may happen that the pointed end of the strip loses its shape at the transition from the first conveyor to the fixing element. By determining, comparing with a reference side and adjusting the shape of the at least one side during the transition from the first conveyor to the fixing element, this loss of shape is at least partially avoided.

In the known method, the rear and the front end are engaged in their entirety and pivoted by the pivotable manifold. In actual practice, it has been found that in certain types of strip material this can cause deformations in the strip material, which deformations harm the quality of the final product in which the strip is used. These deformations are at least largely avoided in an embodiment of a method according to the invention which is characterized in that the adjustment of the shape of the at least one side during conveyance of the strip is carried out dynamically during the transition of the at least one side of the strip from the first conveyor to the fixing element. By carrying out the adjustment dynamically, that is to say that sections of the at least one side are adjusted successively, instead of statically, that is to say adjusting the entire side all at once, not only the deformations occurring in the adjustment of a section are small, but these small deformations can also be assimilated better by the flexible material without an undesirable non-correctable deformation occurring in the strip. The number of sections into which the at least one side should be divided in order to avoid undesirable deformation depends, among other things, on the material used and can be determined by a person skilled in the art through simple experiments.

In actual practice, it has transpired that a dynamic adjustment of the at least one side of the strip can be carried out quickly and, for all strip materials, correctly, when the adjustment of the at least one side of the strip is carried out by executing a relative shifting of the strip relative to the fixing element transverse to the direction of conveyance during the transition.

Especially when the strip has to be wound onto a building drum, which building drum can form the fixing element, or when the strip is conveyed via the second conveyor to the building drum, practice has shown that shifting can be carried out most easily by shifting the first conveyor perpendicularly to its direction of conveyance.

The method according to the invention can especially be applied in the manufacture of pneumatic tires, nowadays mainly radial tires, for vehicles. In the manufacture of these tires, strips of flexible material are mounted onto a building drum to build a belt for the pneumatic tire on the building drum. In general, such a strip will be elongated and have two long and two short circumferential sides. The strip further comprises: a central rectangular part having two long sides and an imaginary centre line, the direction of conveyance of the first conveyor being parallel to the imaginary centre line, a triangular leading end, situated downstream, the one short, leading circumferential side of the strip being formed by the hypotenuse of the leading end and a short side of the leading end lying in the extension of one of the long sides of the central part, the hypotenuse and the short side of the leading end enclosing an acute angle and the one long side of the central part and the short side of the leading end forming the one long circumferential side of the strip, a triangular trailing end, situated upstream, the other short, trailing circumferential side of the strip being formed by the hypotenuse of the trailing end and a short side of the trailing end lying in the extension of the other side of the central part, the hypotenuse and the short side of the trailing end enclosing an acute angle and the other long side of the central part and the short side of the trailing end forming the other long circumferential side of the strip.

In order to obtain a good quality pneumatic tyre, the shape of the strip should not deviate too much from a reference shape and the strip should be placed in an accurate position on the building drum. Depending on the quality standards applied to the pneumatic tyre, the leading and the trailing short circumferential sides should fit together when placed on the building drum. The quality of the pneumatic tyre, into which belt strips having steel reinforcement cords have been built, is for instance checked after vulcanization by means of X-rays. The known method for adjusting the short circumferential sides provides, to an extent, an improvement in quality of the pneumatic tyre. However, the failure percentage, depending on the quality standards set for the pneumatic tyre, remains relatively high. This is caused, among other things, by the above-mentioned deformations which are introduced into the material during the adjustment, but also because when one of the short circumferential sides is rotated, a corner thereof can end up outside the allowed range of tolerance at too big or too small a distance from the imaginary centre line of the strip. This corner, also called dog ear, has a negative influence on the failure percentage.

The method according to the invention provides the possibility to drastically reduce this failure percentage.

For this purpose, an embodiment of a method according to the invention is characterized in that the shape of the short side of the leading end is determined and compared with and adjusted to the shape of a first reference side or in that the shape of the hypotenuse of the leading end is determined and compared with and adjusted to the shape of a first reference hypotenuse. Depending on the quality of the belt material, and the accuracy of the cutting process with which the belt material is cut into belt strips, an adjustment of one of the sides of the leading end can suffice to ultimately obtain a sufficiently high quality of the pneumatic tyre.

Since the front part of the leading end can deviate considerably from the reference, it is to be preferred that the velocity of conveyance of the first conveyor during the determination, the comparison and the adjustment of the shape of a front part of the leading end, is reduced.

In order to obtain a uniformly rotating pneumatic tyre as final product, the weight of the strip must be evenly spread over the pneumatic tyre. This can be achieved by centering the central part of the strip around the imaginary centre line. This centering can be effected in a simple manner by determining the imaginary centre line of the central part and adjusting this to a reference centre line. Preferably, determining the imaginary centre line takes place by determining the long sides of the central part and establishing the middle between these long sides, and determining and adjusting takes place in stages.

A further preferred embodiment of a method according to the invention is characterized in that the shape of the hypotenuse of the trailing end is determined and compared with and adjusted to the shape of a second reference hypotenuse or in that the shape of the short side of the trailing end is determined and compared with and adjusted to a second reference side. This renders it possible to adjust one of the sides of the trailing end to a reference side in a simple manner.

When the second reference hypotenuse corresponds to the first reference hypotenuse, then the trailing short circumferential side and the leading short circumferential side can fit together on a building drum.

When after adjusting the imaginary determined centre line to a reference centre line, the short side of the trailing end needs to be adjusted, then a stable change-over between the two adjustments is obtained when, instead of the imaginary centre line, the shape of a last part of the other long side of the central part is determined and compared with and adjusted to a third reference side.

When first the shape of the short side of the leading end is determined and compared with and adjusted to the shape of a first reference side or the shape of the hypotenuse of the leading end is determined and compared with and adjusted to the shape of a first reference hypotenuse, and subsequently the imaginary centre line of the central part is determined and compared with and adjusted to a reference centre line and finally the shape of the hypotenuse of the trailing end is determined and compared with and adjusted to the shape of a second reference hypotenuse or the shape of the short side of the trailing end is determined and compared with and adjusted to a second reference side or, instead of the imaginary centre line, the shape of a last part of the other long side of the central part is determined and compared with and adjusted to a third reference side, then in actual practice it has been found that an adjustment of the strip is possible, ensuring that the shape of the strip corresponds, within the tolerances, to the shape of a reference strip defined by the reference sides. It has been found that these tolerances may be of the same order as the deviations in material of the strip material.

Determining the shape of the at least one side is done in an economical yet accurate way by means of two linear CCD-cameras.

According to the invention there is also provided a belt strip feeding apparatus for feeding a belt strip on a rotating building drum, which feeding apparatus is provided with a supply reel for containing belt material, with means for unwinding belt material from the supply reel, with conveying means for conveying the unwound belt material to the building drum, successively comprising a roller conveyor, a conveyor belt and a mounting conveyor for mounting the belt strip onto the building drum, with cutting means placed above the roller conveyor for cutting the belt material into a belt strip, such that the belt strip is elongated and has two long circumferential sides and two short circumferential sides and that the strip comprises: a central rectangular part having two long sides and an imaginary centre line, the direction of conveyance of the roller conveyor being parallel to the imaginary centre line, a triangular leading end, situated downstream, the one short, leading circumferential side of the strip being formed by the hypotenuse of the leading end and a short side of the leading end lying in the extension of one of the long sides of the central part, the hypotenuse and the short side of the leading end enclosing an acute angle and the one long side of the central part and the short side of the leading end forming the one long circumferential side of the strip, a triangular trailing end, situated upstream, the other short, trailing circumferential side of the strip being formed by the hypotenuse of the trailing end and a short side of the trailing end lying in the extension of the other side of the central part, the hypotenuse and the short side of the trailing end enclosing an acute angle and the other long side of the central part and the short side of the trailing end forming the other long circumferential side of the strip, which belt strip feeding apparatus is characterized by determining means for determining the shape of at least one side of the strip, comparison means for comparing the shape as determined of the at least one side to the shape of a reference side, and adjusting means for adjusting the shape as determined of the at least one side to the shape of the reference side, depending on the outcome of the comparison, the determining means being placed at the transition from the roller conveyor to the conveyor belt.

BRIEF DESCRIPTION OF THE DRAWINGS

Further features and advantages of a method and belt strip feeding apparatus according to the invention will become clear from the description given hereafter, in which, by way of example, some embodiments of the invention will be described by means of the drawing. In the drawing:

FIGS. 2, 3 and 4 show a schematic top view of a part of the belt strip feeding apparatus according to FIG. 1;

FIG. 5 shows a schematic side view of a conveyor belt to be used in a belt strip feeding apparatus according to the invention;

Before further going into the subject of actually adjusting the shape of at least one side of a strip of flexible material to a reference side, an apparatus will first be described in which the adjusting of the shape can be used.

DETAILED DESCRIPTION OF THE INVENTION

Figure 1:
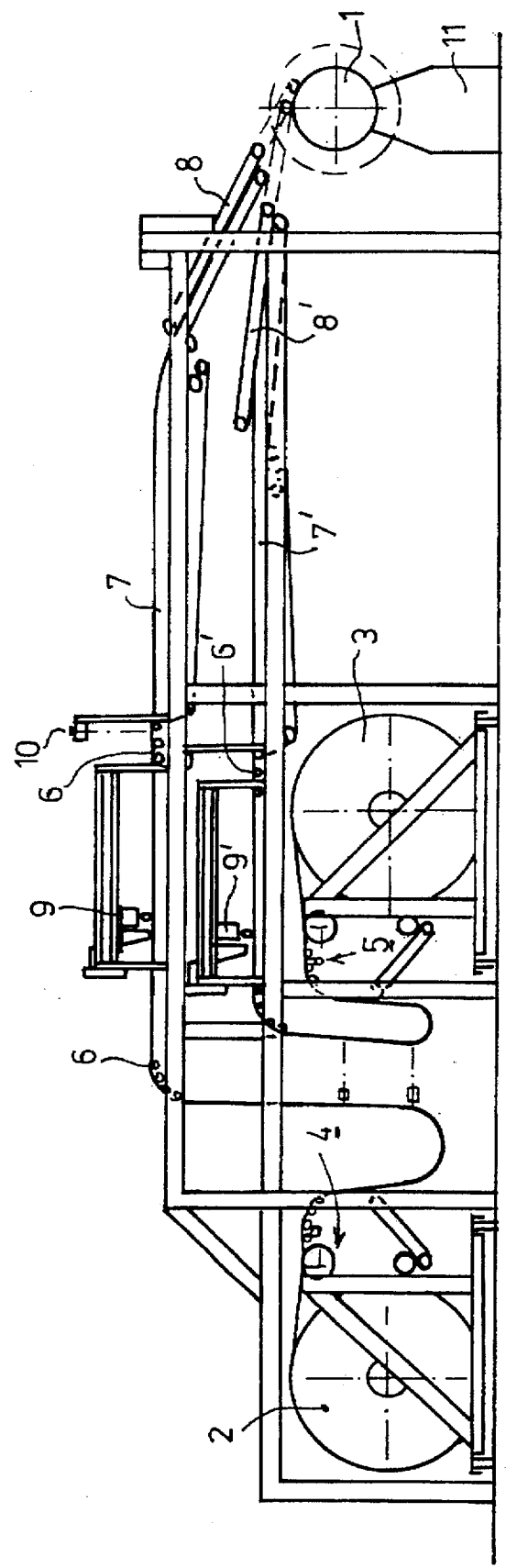
FIG. 1 shows a schematic side view of a belt strip feeding apparatus according to the invention.

The belt strip feeding apparatus, represented schematically in FIG. 1, for feeding a belt strip to a rotating building drum 1 comprises two exchangeable supply reels 2 and 3 for containing belt material. The belt material is unwound by means 4 and 5 from the supply reels 2 and 3, respectively, and conveyed to the building drum 1 via conveying means 6, 7, 8 and 6', 7' and 8'. Each of the conveying means successively comprises a roller conveyor 6, 6', a conveyor belt 7, 7' and a mounting conveyor 8, 8' for mounting the belt strip onto the building drum. A cutting means 9, 9' is placed above every roller conveyor 6, 6' for cutting the belt material into a belt strip. The belt strips supplied by the conveying means 6, 7, 8 and 6', 7' and 8' are one by one wound around the building drum 1, such that a packet consisting of superimposed belt strips is built on the building drum 1.

The belt apparatus comprises determining means 10 which are placed at the transition from the roller conveyor 6 to the conveyor belt 7. These determining means 10 determine the shape of at least one side of the belt strip. The shape as determined of the at least one side is compared in comparison means (not shown) with the shape of a reference side concerned. For this purpose, the comparison means are connected to the determining means 10 and preferably comprise a first memory for storing the shape as determined of the at least one side of the strip, a second memory for storing the shape of the at least one reference side concerned, calculating means for calculating the difference between the shape as determined of the at least one side and the shape of the reference side, and control means for controlling the adjusting means (not shown), depending on the calculated difference. These adjusting means adjust the shape of the at least one side to the reference side, depending on the calculated difference. In order to keep the drawing simple, only determining means 10 for belt material present on the upper conveying means 6, 7, 8 have been shown. It will be clear, however, that analogous determining means can be present at the lowest conveying means.

The building drum 1 can have various diameters, depending on the diameter of the pneumatic tyre which is to be produced. The minimum diameter has been represented by a continuous line, the maximum diameter of the building drum 1 has been represented by interrupted lines. In order to allow for the manufacture of pneumatic tyres having greatly differing diameters, the frame 11 of the building drum 1 is constructed such that building drums may exchangably be mounted thereon.

Figure 2:
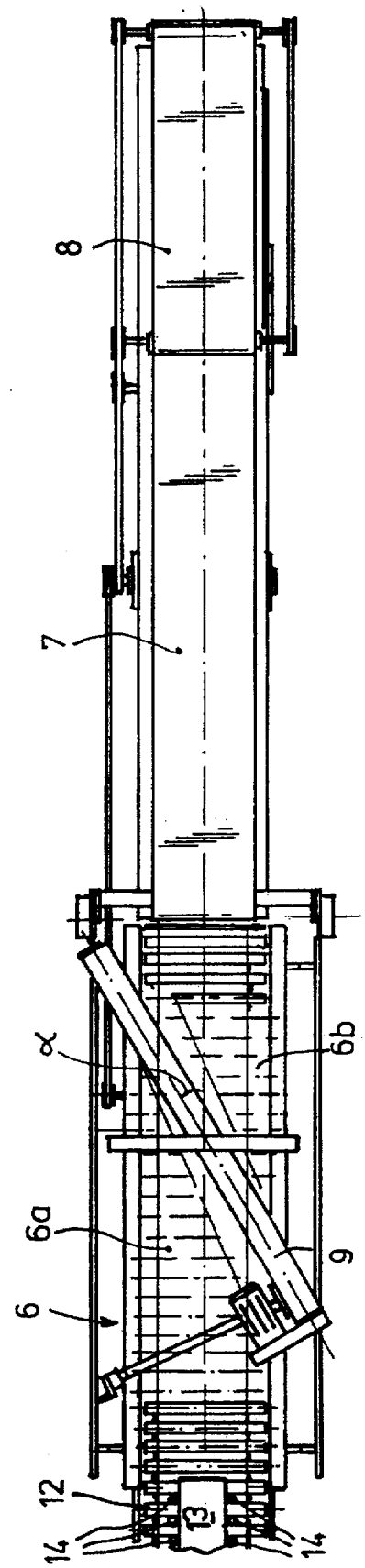

FIG. 2 shows a schematic top view of a part of the belt strip feeding apparatus represented in FIG. 1. The roller conveyor 6 is built up by a number of bearing rollers 12, each of which is driven such that belt material 13 which is present on the roller conveyor 6 is conveyed to the conveyor belt 7. The belt material 13 is herein centered at the beginning of the roller conveyor 6 by guide rollers 14 on both sides of the belt material 13. When the belt material 13 has arrived in a position under adjustable cutting means 9, the belt material 13 is cut under an angle α, which lies for instance between 18° and 30°. When the belt material has been reinforced by steel cords running almost parallel to each other, said cords enclosing an acute angle with the imaginary centre line of the material, the belt material is preferably not fixed during cutting. As a result, the cutting means 9 can cut the belt material between the cords, without the steel cords becoming exposed.

Figure 3:
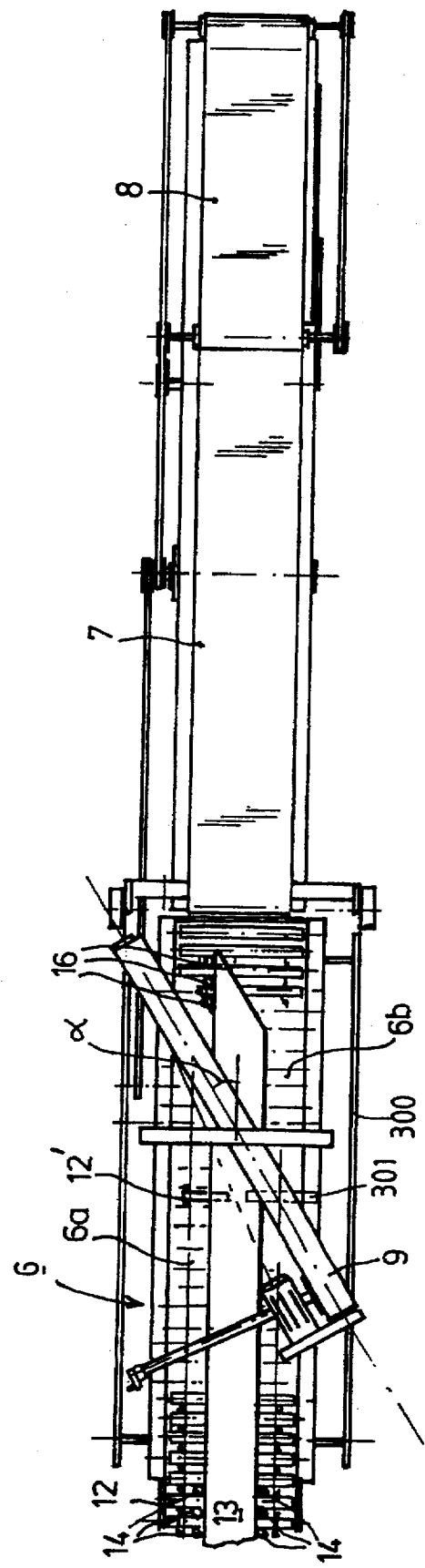

After cutting, the roller conveyor 6 conveys the cut belt material 13 further in the direction of the conveyor belt 7, as shown in FIG. 3. The roller conveyor 6 comprises two parts 6a and 6b which can be coupled by means of an electromagnetic coupling (not shown). The bearing rollers of the part 6a extend, at the cutting means 9, from one edge of the roller conveyor up to a distance from or up to the line of cut determined by the cutting means, such as for instance roller 12'. Opposite bearing roller 12' of part 6a a bearing roller (not shown) of part 6b extends up to the other edge of the roller conveyor. During further conveyance the belt material is pressed against guide rollers 16 by a pressure roller (not shown) situated above.

When the belt material 13 passes the transition 15 between roller conveyor 6 and conveyor belt 7, then, as will be described in more detail later, at least one side of the belt material is adjusted to a reference side. When the belt material 13 has covered a distance from the cutting means 9 which corresponds to the desired length of a belt strip, then the conveyance of the belt material is stopped and the cutting means 9 are activated to cut the belt material, thus forming a belt strip. This belt strip 17 is further conveyed by part 6b of the roller conveyor 6 in the manner as shown in FIG. 4.

When the belt material reaches the conveyor belt 7, the adjusted shape of the side is fixed by fixing means which fix the belt material on the conveyor belt 7. These fixing means can be formed for all types of belt material, so including non-ferro belt material, by pressures belts placed above the conveyor belt 7 or vacuum means below the conveyor belt 7. When the belt material has been reinforced with steel cords, the fixing means are preferably formed by magnets 18, as shown in FIG. 5. Depending on the surface of the belt strip present on the conveyor belt 7, great forces are exercised on the conveyor belt when the belt strip is pulled against the conveyor belt 7 by the magnets 18. If these forces become too great, the conveyor belt 7 could start to slip in an unchecked manner, which would be harmful to the adjusted shape. In order to prevent the conveyor belt from slipping in an unchecked manner, the conveyor belt 7 should be driven without variations or with a constant (small) slip. A driving of the conveyor belt 7 without variations or with a constant (small) slip is for instance obtained by driving the conveyor belt 7 with three drivable drive rollers 19, 20 and 21. One of these drive rollers 21 is placed at the end of the conveyor belt 7 and two of these somewhere halfway the conveyor belt 7. These two drive rollers 19, 20 are positioned relative to each other in such a way that the conveyor belt 7 passes between them in an S-shape. Moreover, practice has shown that, depending among other things on the velocity of the conveyor belt relative to the permanent magnet 18, the conveyor belt 7 can execute a movement transverse to its direction of travel, which has a negative effect on the adjusted shape of the at least one side of the belt strip. By laterally confining the conveyor belt 7 by means for laterally restricting the freedom of movement of the conveyor belt 7, this negative effect is avoided. These means can be formed by raised edges between which the conveyor belt 7 is placed.

The conveyor belt 7 preferably comprises an encoder 22 for measuring the movement of the conveyor belt 7. Although there are other means for measuring the movement or shift of the conveyor belt, which measurement could be used to measure the shape of a certain side of the belt strip, an encoder is preferred because it provides a real time measurement. The conveyor belt is controlled by a drive unit 23 with an (other) encoder coupled thereto. In the present case, the drive rollers 19, 20, 21 are connected to the roller conveyor via geared belts, so that the (other) encoder also controls the movement hereof.

Although adjusting the shape of at least one side of a strip of flexible material, such as a belt strip, to a reference side concerned, may be carried out in the statical manner after determining the shape, as described in U.S. patent specification 4,608,890, the invention will be described by means of a dynamic adjustment which takes place during the transition of the belt material from the roller conveyor to the conveyor belt. In such a dynamic adjustment, sections of the at least one side are successively adjusted to sections of the reference side concerned.

Figure 6:
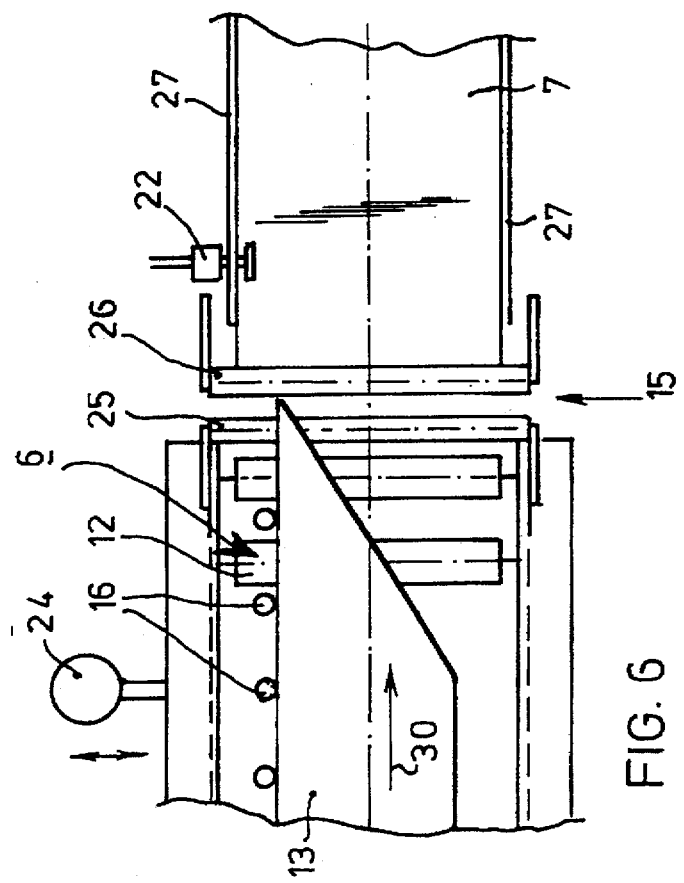
FIG. 6 shows a schematic enlarged representation of a part of FIG. 3.

The cycle time for conveying the belt material, cutting the belt strip, adjusting the belt strip to a reference strip and further conveying it to a building drum turns out to be sufficiently short for mass production when the dynamic adjustment is carried out by moving the belt material 13 relative to the conveyor belt 7 transverse to the direction of conveyance 30 during the transition 15 of the belt material from the roller conveyor 6 to the conveyor belt 7, as is schematically shown in FIG. 6. This relative transverse shift takes place by shifting the entire roller conveyor 6, on which the belt material 13 is situated, controlled by an electronic unit 24 transverse to its direction of conveyance 30. As a result, the belt material situated on the roller conveyor 6 moves relatively vis a vis the conveyor belt 7, with encoder 22 and raised edges 27 for confining the conveyor belt 7. The electronic unit 24 controls the lateral shift of the roller conveyor, depending on the calculated difference between the shape of the at least one side of the belt material and the reference side.

The dynamic adjustment can possibly be stabilized by bringing the belt material 13 between two pressure rollers 25, 25', which pressure rollers 25, 25' are coupled to the roller conveyor 6. The rollers 25, 25' are cylindrical, and their axis is transverse to the direction of conveyance and they have preferably parallel circumferential grooves.

Furthermore, a cylindrical roller 26 provided with parallel circumferential grooves is situated above the beginning of the conveyor belt 7 for pressing the belt material 13 against the conveyor belt 7. The roller 26 aids in fixing the adjusted shape of the at least one side, since making the permanent magnet 18 reach up to the beginning of the conveyor belt 7 (FIG. 7) would only be possible in a very complicated and expensive manner.

In order to render a correct determination of the shape of the at least one side possible, the transition 15 should have a sufficient width. On the other hand, the transition 15 should not be too wide, because in that case no sufficiently correct adjustment would be possible. In acutal practice, it has been found that a width of about 7 mm for the transition 15 satisfies both requirements. The diameter of the rollers 25, 25' should therefore be such, that such a width can be realized.

Alternatively, obtaining a transverse relative shift of the belt material is possible by shifting the conveyor belt 7 transverse to its direction of conveyance, or by clamping the belt material 13 between two pressure rollers 25, 25', and by exclusively shifting these pressure rollers 25, 25' transverse to the direction of conveyance.

Figure 7:
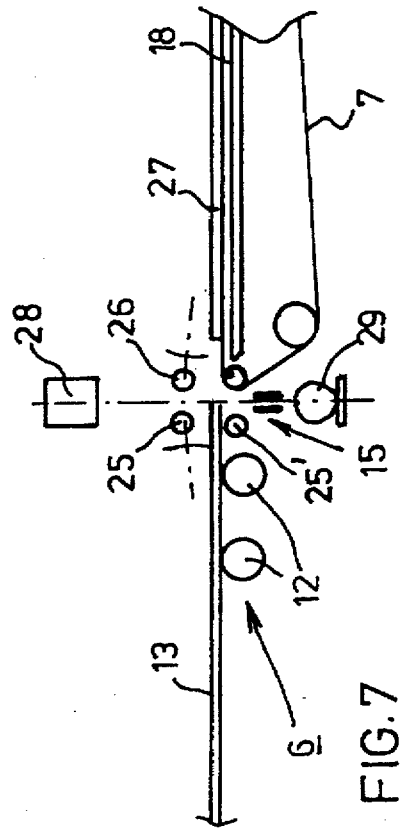
FIG. 7 shows a schematic side view of FIG. 6.
Figure 8:
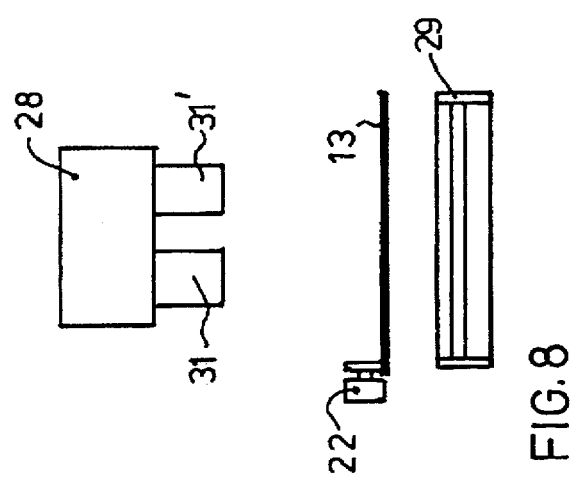
FIG. 8 shows a schematic view from the roller conveyor, showing the CCD-cameras.

Determining the shape of the side of the belt material to be adjusted is preferably carried out during the transition 15 from roller conveyor 6 to conveyor belt 7 by linear CCD-cameras 31 and 31' placed above the transition, which cameras are incorporated into a common housing 28, as shown in FIGS. 7 and 8. By incorporation into the common housing 28, the mutual position of the CCD-cameras 31, 31' is accurately fixed. A lamp 29 is placed under the transition 15, said lamp sending light to the CCD-cameras 31, 31'. The linear CCD-cameras 31, 31' can accurately detect the presence and the position of the belt material between lamp and cameras. The lamp 29 preferably is a HF-TL-lamp, of for instance 100 Hz, to avoid interference by ambient light.

Other ways of determining the position, and thus the shape of a side, of the belt material can also be used in the invention. Determinations by IR detectors or by means of lasers or induction measuring equipment is possible, although they are often more expensive than the use of linear CCD-cameras.

Hereafter, adjusting an actual belt strip to a reference strip will be described in more detail. It will be clear that not all steps need necessarily be carried out, but that, depending on the quality of the supplied belt material and the cutting process, one or more steps can be omitted.

Figure 9:
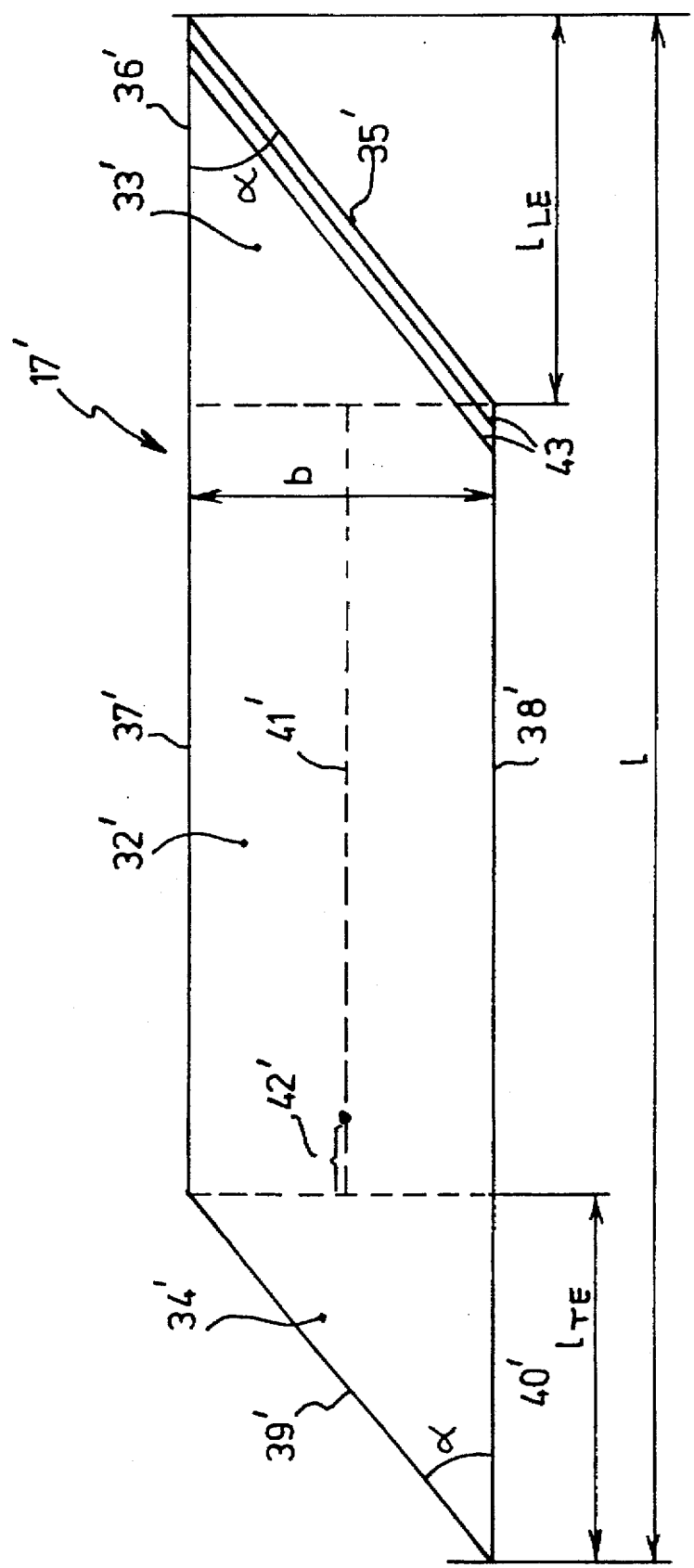
FIG. 9 schematically shows a reference belt strip.

FIG. 9 schematically shows an ideal shape of a belt strip, which can be used as reference belt strip. The belt strip 17' is elongated and has in general a length L of between 1400 and 3100 mm and a width b of between 80 and 300 mm. The belt strip 17' has two long circumferential sides and two short circumferential sides 35',39'. The belt strip comprises a central rectangular part 32' having two long sides 37' and 38' and a centre line 41', a leading end 33' and a trailing end 34'. The triangular leading end 33', situated downstream, has an hypotenuse forming the short, leading circumferential side 35' and a short side 36' forming the one long circumferential side of the belt strip 17' together with the long side 37' of the central part 32'. The hypotenuse 35' and the short side 36' enclose an acute angle α, which in general lies between 18° and 30°. The acute angle α corresponds to the angle under which a great number of parallel running steel reinforcement cords 43 lie in the belt material. The triangular trailing end 34', situated upstream, has an hypotenuse forming the trailing, short circumferential side 39' of the belt strip 17' and a short side 40' forming the other long circumferential side of the belt strip 17' together with the other long side 38' of the central part 32'.

Figure 10:
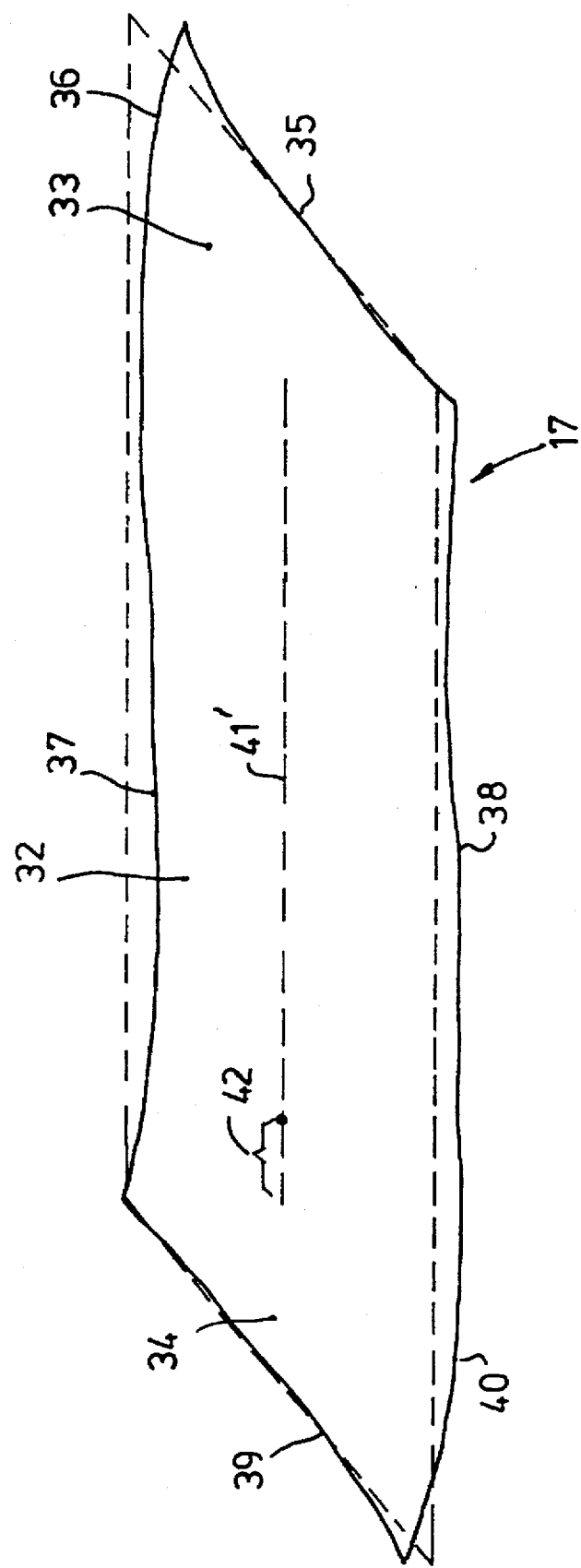
FIG. 10 schematically shows a possible shape of an actual belt strip.

FIG. 10 schematically shows a belt strip 17 as it usually looks after cutting. The width of the central part 32 can vary in practice by 2 mm, the variation in width being far from symmetrical. Because the belt material is wound on supply reels, tensions are created in the material. Additionally, the difference in tension between steel reinforcement cords, which often consist of several intertwined wires, and the rubber material between the cords also creates tensions in the material. After cutting, these tensions relax, as a consequence of which the corner of the leading and trailing end bends randomly inwards, outwards or upwards. Consequently, the actual shape of the hypotenuse deviates from the path travelled by the knife of the cutting means. It is remarked that the long side 37 in the present case is relatively straight due to the one-sided centering by guide rollers 16 (see FIG. 3).

It is, among other things, the object of the invention to adjust this actual shape as accurately as possible to this reference shape or to other references. Thus, it is for instance possible to adjust the shape of the trailing short end 39 to the shape of the leading short end 35 and not to a reference side such as 39'.

Figure 11:
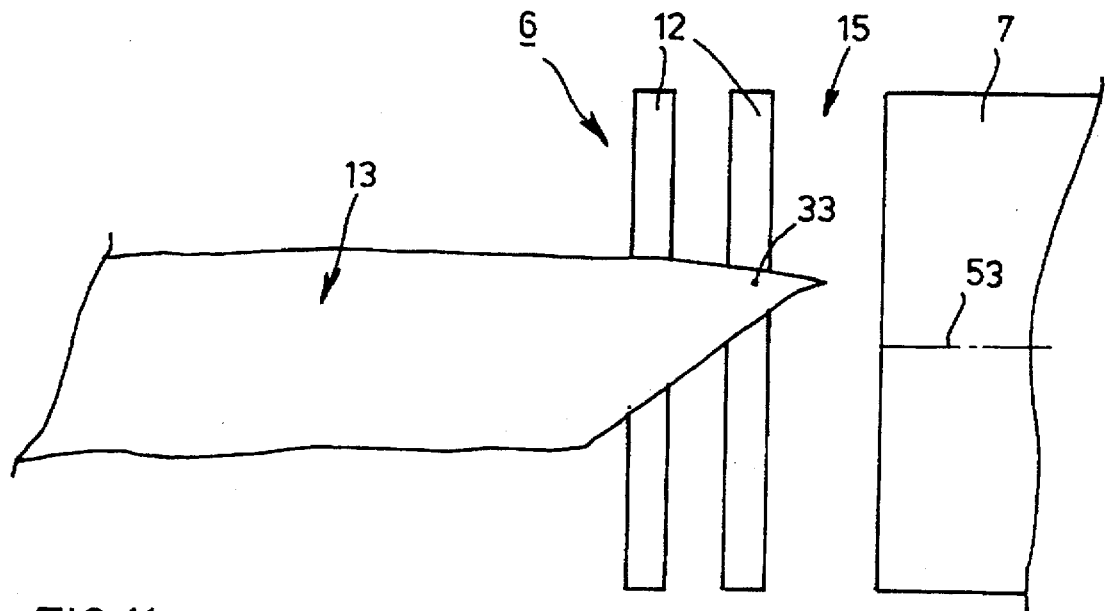
FIG. 11 shows a schematic top view of the transition between roller conveyor and conveyor belt, the corner of the belt strip being situated at the transition.
Figure 12:
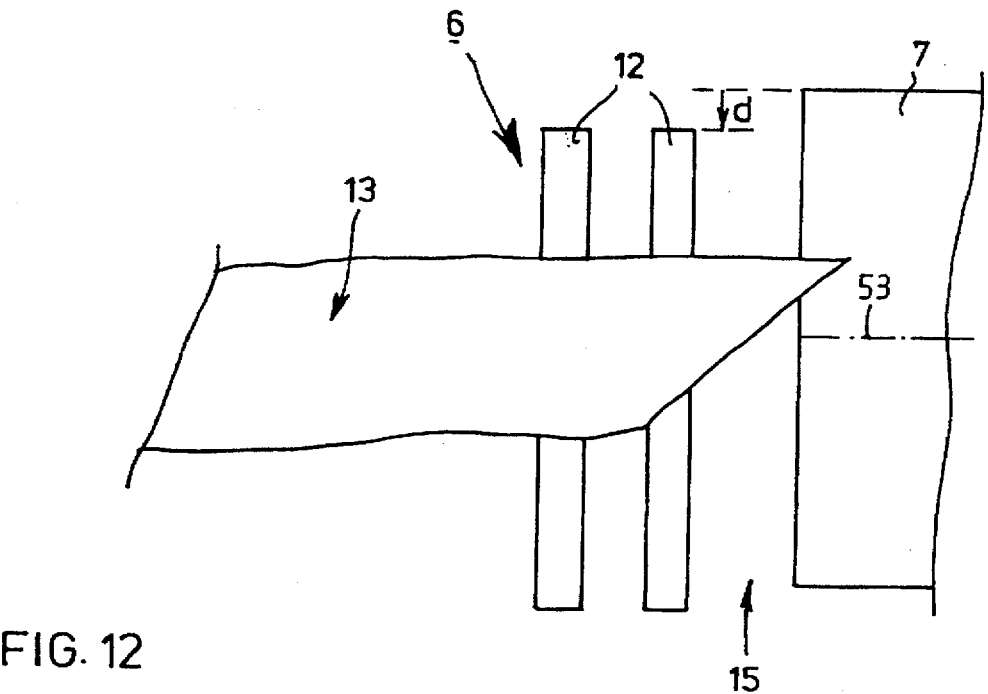
FIG. 12 shows a schematic top view analogous to FIG. 11, the belt strip covering the transition.

FIG. 11 schematically shows a top view of the transition 15 between roller conveyor 6 and conveyor belt 7 with imaginary centre line 53. The belt material 13 is conveyed such that the corner of the leading end 33 is situated exactly between the CCD-cameras and the HF-TL lamp (not shown). From this position, the belt material 13 is further conveyed to the conveyor belt 7, which conveyance is controlled by a second encoder. The position of the short side and/or the hypotenuse of the leading end 33 is each time determined after every pre-set distance by the linear CCD-cameras and the HF-TL lamp, the linear cameras having a direction of scanning which is transverse to the direction of conveyance. The encoder also controls the fact that the conveyor belt has covered the pre-set distance and that a determination should be executed. It has been found that when the pre-set distance corresponds to half the average distance between the steel reinforcement cords, the adjustment can be carried out best. This half the average distance is in general about 1½ mm. After the position of the short side and/or the hypotenuse has been determined, this position is compared to the position taken up by the reference side in this position and the difference between them is determined. This difference is corrected by shifting the roller conveyor 6 over a distance d which corresponds to that difference (see FIG. 12). This distance d is generally below 3 mm. The belt material 13 is further conveyed until it reaches the conveyor belt 7 where it is fixed. Although during this further conveyance the belt material can once again be shifted (by the next adjustment) somewhat laterally before the belt material reaches the conveyor belt, the deviation of the small front corner of the leading end which may possibly have been introduced hereby turns out to be almost negligible and to lie within the tolerances.

The speed of the determination is such that the belt material can be conveyed continuously, the velocity of conveyance for adjusting the front part of the leading end (about the first 20–30 mm thereof) being reduced, since it is precisely at this point that the difference in distance d is greatest and that the roller conveyor should have sufficient time to cover this distance between two determinations of position.

Figure 13:
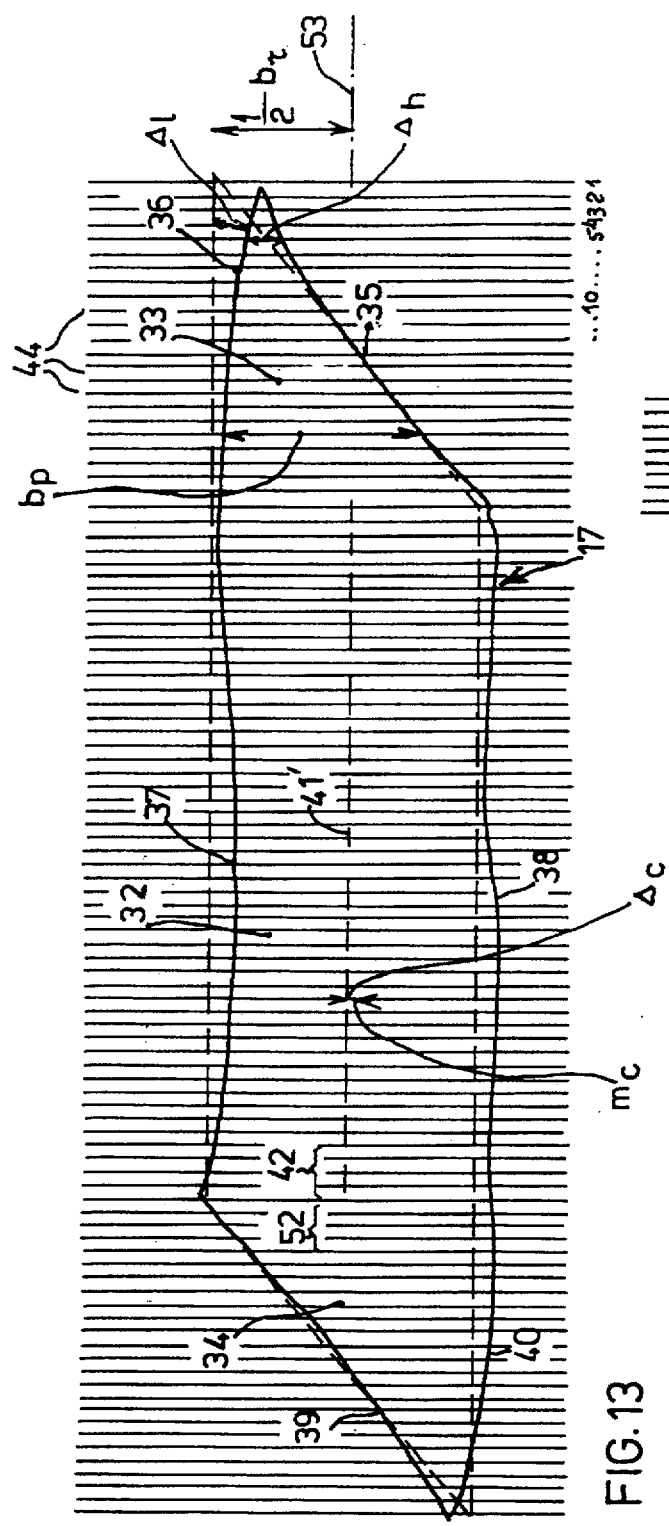
FIG. 13 schematically shows a determining grid for determining the shape of a side of the belt strip.

When the entire belt strip 17 has been conveyed to the conveyor belt 7, the shape of the belt strip has been determined across its entire length. The determining grid is then as shown in FIG. 13. The grid lines 44 are spaced at intervals of about 1½ mm.

The positions of the belt strip edges, determined by the CCD-cameras, are transmitted to a first memory of comparison means. These comparison means comprise a second memory, containing the parameters necessary to determine the reference sides. These parameters describe among other things:

the position of the imaginary centre line 43 of the conveyor belt 7 (or another fixing element such as a building drum), the width $b_r$ of the reference belt strip (or the average width of one or more belt strips which have been adjusted prior to the current belt strip), the length of the reference belt strip, the length of the central part, the length of the short side of the leading and trailing end, the size of the acute angle $\alpha$ for determining the position of each point of the hypotenuse at a certain distance from the point of the leading end, possible corrections to the above-mentioned parameters, possible other apparatus parameters.

The comparison means also comprise calculating means for calculating the difference between the position as determined and the reference position, and control means for controlling the electronic unit which controls the lateral shift of the roller conveyor.

The leading end 33 can be adjusted to the reference leading end in two ways. On the one hand, the short side 36 can be adjusted to the reference short side 36' (FIG. 9). On the other hand, the hypotenuse 35 can be adjusted to the reference hypotenuse 35' (FIG. 9). For the first adjustment, the difference $\Delta_l$ between the long side of the current belt strip 17 and the reference long side is calculated. The roller conveyor is shifted over this distance $\Delta_l$, so that the long side of the current belt strip is placed at ½ $b_r$ from the imaginary centre line 53 of the conveyor belt. This calculation of $\Delta_l$ and the corresponding shift is successively carried out from grid line 1, 2, . . . to the last grid line scanning the leading end. During each scan along a grid line, preferably the width of the leading end is determined and stored. The last grid line scanning the leading end can be determined by the parameter for the length of the short side of the leading end ($l_{LE}$) or by observing the measured variation in width of the leading end. A slight variation in width indicates that the grid lines have reached the central part of the belt strip.

For the latter adjustment, the difference $\Delta_h$ between the hypotenuse 35 of the current belt strip 17 and the reference hypotenuse 35' is calculated. The roller conveyor is shifted, depending on this difference, over a distance, such that the position concerned of the current hypotenuse 35 (for instance in the point on grid line 5) coincides with the position relative to the reference centre line 41' indicated by the parameters.

In this way, the shape of the current leading edge is determined, thus providing a possibility to check the quality of the cutting process and the belt material, and the shape of one side of the leading end is adjusted with an accuracy in the order of the variation in width of the material. Of course, adjustment of the one side does not automatically mean that the other side has also been accurately adjusted. In practice it has been found, however, that when the belt material meets the usual specifications stated by the manufacturers of tires, the other side also falls within the tolerances.

When the central part 32 of the belt material is situated between the CCD-cameras and the HF-TL lamp, the mutual position of the long sides 37 and 38 of the central part 32 is determined, and the width of the central part 32. Per grid line, the middle $m_c$ of the central part 32 is determined and the deviation $\Delta_c$ hereof relative to the reference centre line 41'. The roller conveyor is shifted such, depending on the determined deviation $\Delta_c$, that the middle of the central part coincides with the reference centre line. Owing to this, the central part is placed symmetrically around the reference centre line. This provides a good uniformity in the pneumatic tyre which ultimately is to be manufactured.

Since the width of the central part can vary by about 2 mm, the adjusted long sides 37 and 38 of the current belt strip are not identical to the reference long sides 37' and 38'. However, this deviation is relative to the reference centre line is halved so that now, too, the central part once again meets the set tolerance limits. Moreover, it is possible to use for reference width $b_r$ the average width of the central part of the preceding belt strip, which average width is stored as parameter in the comparison means. As a result of this, it is achieved that the leading and the trailing end, when they are wound around the building drum, fit together accurately, even when the belt material does not, to a certain extent, meet the specifications.

The adjustment of the trailing end 34 can also take place in two ways. On the one hand, the short side 40 can be adjusted to the reference short side 40', while on the other hand, the hypotenuse 39 can be adjusted to the reference hypotenuse 39'. These adjustments take place analogously to the adjustments described for the leading end.

It has been found, however, that when switching from the adjustment to the reference centre line 41' to the adjustment of the short side 40 to the reference short side 40', a discontinuity can occur in the belt strip which leads to a deviant shape. In order to prevent this, it is preferred that a rear part 42 of the central part 32 is not adjusted to the reference centre line 41', but that the part of the long side 38 belonging to this rear part 42 is adjusted to the reference side 38'. Thus, the final adjusted belt strip will become more regular. The length of this rear part 42 can differ per belt material, but has been found to usually lie between 10 and 30 mm. The comparison means also serve to contain a value for the width of this rear part 42' (FIG. 9), to indicate the switch between the two different adjustments.

When switching from an adjustment to the reference line 41' to an adjustment of the hypotenuse 39 to the reference hypotenuse 39', then it is to be preferred that of the first part 52 of the trailing end 34, for instance the first 10 mm, the short side 40 is adjusted to the reference short side 40' to avoid a similar discontinuity.

Figure 14:
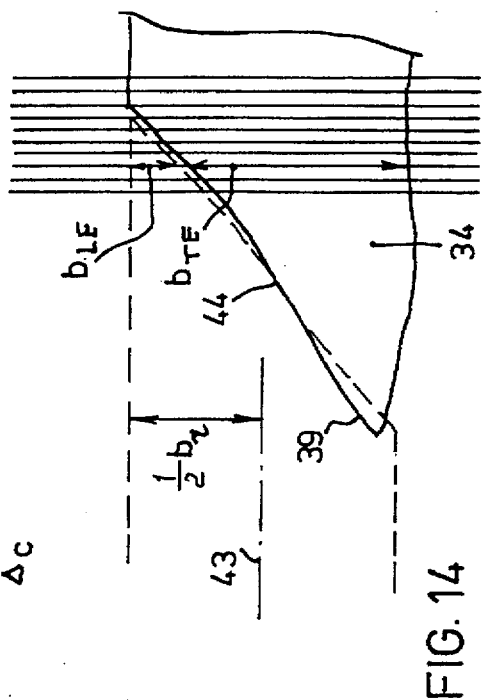
FIG. 14 schematically shows the adjustment of the short, trailing circumferential side to the short, leading circumferential side.

When the short side of the leading end has been adjusted to the reference short side, it is possible to adjust the hypotenuse 39 of the trailing end 34 to the hypotenuse of the leading end. This adjustment is possible because each time the width $b_{LE}$ of the leading end is determined. Although the measured width of the leading end differs from the width of the leading end after adjustment, this difference is so small in actual practice, often in the order of the variation in the width of material, that this has no effect on this adjustment. The hypotenuse 44 of the leading end after adjustment has been shown in FIG. 14. During determination of the shape of the trailing end 34, the width $b_{TE}$ is measured each time. In the comparison means the difference is now calculated between $b_r - b_{LE} - b_{TE} = \Delta_b$. The roller conveyor is laterally shifted over this difference $\Delta_b$, so that ultimately the hypotenuse of the trailing end and that of the leading end have a complementary shape.

The adjustments described above can be carried out in this way because the shift of the conveyor belt on the roller conveyor is continuously monitored, for instance by the encoder. The comparison means therefore know at what moment which part of the reference strip should be taken for comparison with the current belt strip. After the entire adjusted belt strip has come to lie on the conveyor belt, the roller conveyor is preferably brought to its starting position.

With the method and the apparatus according to the invention, a belt strip can be adjusted to a reference in such a way that further working of or with the adjusted belt strip can take place accurately and reproducibly. When the adjusted belt strip is mounted about a building drum, the centering thereof has been found to fall within the tolerance limits because the central part is positioned symmetrically relative to a reference centre line, which of course in that case is aligned relative to the building drum, and the leading and trailing, short end fit together within the tolerance limits.

It will be clear to a person skilled in the art that the reference sides with which the sides of the current belt strip are compared, can be different from those as shown in the figures. Applying a step or a curve is possible in order to make a certain correction for a current production environment. Furthermore, the adjustment can also be carried out without the use of a conveyor belt, for instance by carrying out the adjustment between the transition from the roller conveyor to the building drum.

When a conveyor belt is used for further conveying the adjusted belt strip, then the length of the belt strip is preferably measured on the conveyor belt. Especially when the belt strip has been reinforced with steel cords, impenetrable to the knife of the cutting means, the length of the belt strip varies by approximately the thickness of the cord. The measured actual length can be adjusted to the circumference of the building drum, by varying the velocity of the mounting conveyor relative to the velocity of rotation of the building drum. If the velocity of the mounting conveyor is smaller, then the belt strip is stretched during mounting on the building drum. If the speed is higher, then the belt strip is clenched.

Figure 15:
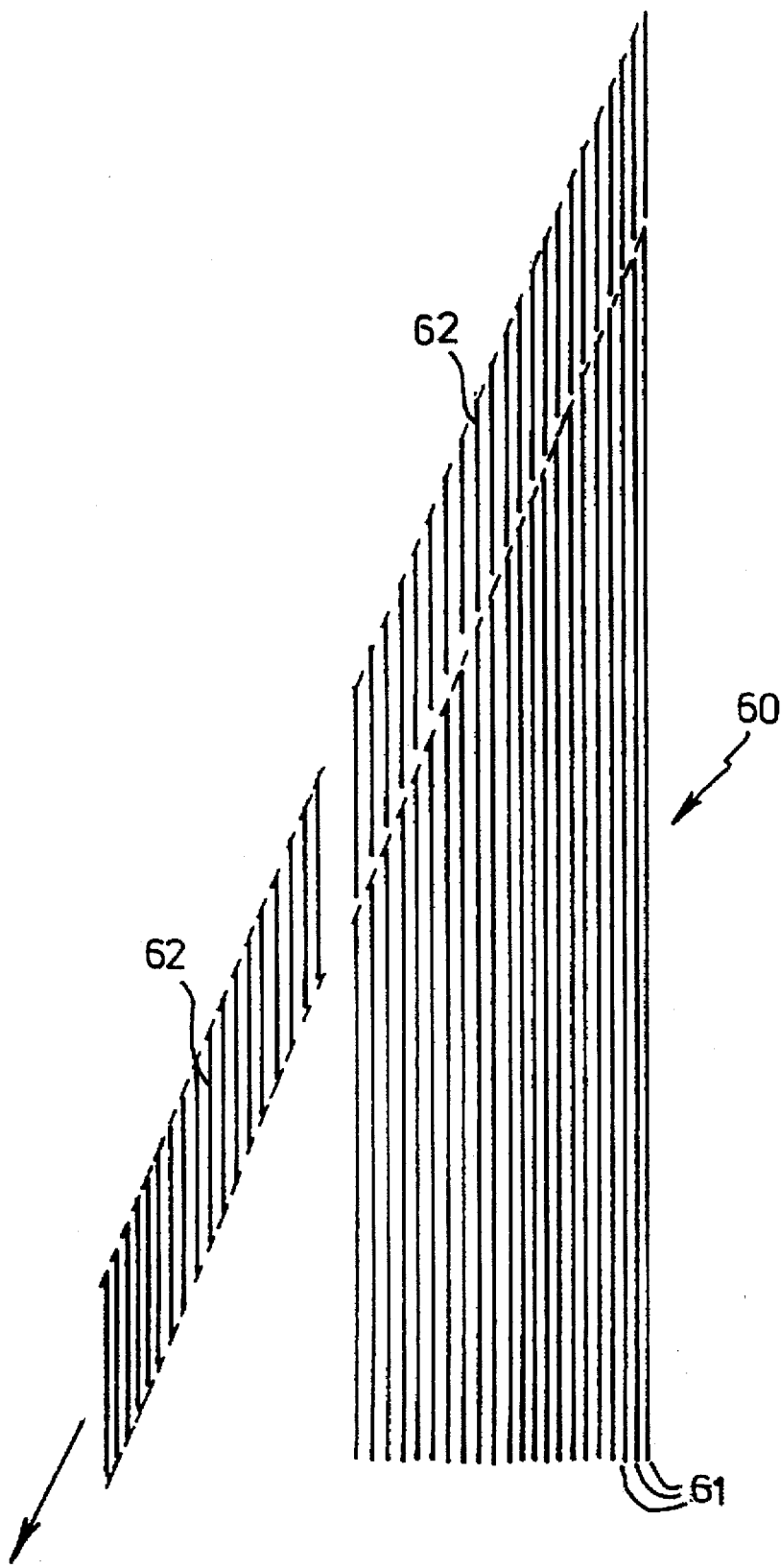
FIG. 15 shows another field of application of the invention.

Furthermore, the invention is not only applicable in a belt strip feeding apparatus, but also in a cutting apparatus where strips of rubber material containing steel cords 61, which run in longitudinal direction, are cut into belt strips 62 (FIG. 15). This invention is also especially applicable when attaching these strips 62 having pointed corners.

We claim:

1. A method for adjusting a belt strip as it passes from a first conveyor to a second conveyor, said method comprising the steps of:
   (a) cutting a belt strip from a supply of belt material, said belt strip having leading and trailing ends;
   (b) conveying the belt strip on the first conveyor and at a first velocity towards the second conveyor, the second conveyor being spaced apart from the first conveyor by a transition;
   (c) determining a shape of at least one side of the belt strip as it passes over the transition;
   (d) comparing the determined shape of the at least one side with a shape of a stored reference belt strip;
   (e) shifting the belt strip relative to the second conveyor in a direction transverse to the direction of conveyance in response to the comparison; and
   (f) fixing that portion of the belt strip which has passed over the transition, onto the second conveyor, wherein steps (c)–(f) are carried out substantially concurrently as the belt strip passes over the transition.

2. The method of claim 1, wherein the step of shifting the belt strip is carried out by shifting the entire first conveyor in a direction transverse to the direction of conveyance.

3. The method of claim 1, further comprising the step of:
   reducing the velocity of the belt strip to a second velocity lower than said first velocity during the steps of determining, comparing and shifting, said second velocity being greater than zero.

4. The method of claim 1 wherein the belt strip has a substantially parallelogram shape comprising:
   a substantially triangular leading end having a leading hypotenuse and a leading short side;
   a substantially rectangular central part having a first long side which is an extension of said leading short side, and a second long side parallel to said first long side, one end of said central part being attached to said leading end; and
   a substantially triangular trailing end formed with a trailing hypotenuse and a trailing short side, said trailing short side being an extension of said second long side, said trailing end attached to a second end of said central part,
   said leading and trailing hypotenuses being formed at substantially the same angle relative to respective said leading and trailing short sides.

5. The method of claim 4, wherein a shape of at least one of said leading hypotenuse and said trailing hypotenuse is determined and then compared with a corresponding shape of at least one of a reference leading hypotenuse and a reference trailing hypotenuse.

6. The method of claim 4, wherein a shape of at least one of said leading short side and said trailing short side is determined and then compared with a corresponding shape of at least one of a reference leading short side and a reference trailing short side.

7. The method of claim 4, including the steps of:
   determining a width, and a middle, of the central part based on positions of the first and second long sides, as the central part passes over the transition;
   comparing said middle with a reference center line based on a reference width; and
   shifting the belt strip in a direction transverse to the direction of conveyance, and by a distance sufficient to have the middle of its central part coincide with said reference center line.

8. The method of claim 7, wherein the reference width is an average width of a central part of a preceding belt strip.

9. The method of claim 4, including the steps of:
   determining a shape of at least one of said leading short side and said leading hypotenuse, as the leading end passes over said transition; and
   comparing said determined shape with a corresponding shape of at least one of a reference leading short side and a reference leading hypotenuse.

10. The method of claim 9, further comprising the steps of:
    determining a width, and a middle, of the central part based on positions of the first and second long sides, as the central part passes over the transition; and
    comparing said middle with a reference center line based on a reference width.

11. The method of claim 10, further comprising the steps of:
    determining a shape of at least one of said trailing short side and said trailing hypotenuse, as the trailing end passes over the transition; and
    comparing said determined shape with a corresponding shape of at least one of a reference trailing short side and a reference trailing hypotenuse.

12. The method of claim 11, further comprising the step of:
    comparing, for a rear part of said central part, a portion of said second long side belonging to said rear part, with a corresponding portion of a reference second long side, before determining a shape of said trailing short side.

13. The method of claim 11, further comprising the step of:

comparing a first portion of said trailing short side, with a corresponding first portion of a reference trailing short side, before determining a shape of said trailing hypotenuse.

14. The method of claim 11, wherein a width of the belt strip is measured every 1.5 mm as it passes over said transition.

15. The method of claim 4, further comprising the steps of:
  determining and storing a width of the leading end as it passes over the transition, said width being defined between the leading short side and the leading hypotenuse,
  comparing said determined width with a stored, reference width from an immediately preceding portion of said leading end, and
  detecting when said central part begins passing over the transition based on a variation in said determined width.

16. A method for adjusting a belt strip as it passes from a first conveyor to a rotating building drum, said method comprising the steps of:
  (a) cutting a belt strip from a supply of belt material, said belt strip having leading and trailing ends;
  (b) conveying the belt strip on the first conveyor and at a first velocity towards the building drum, said building drum being spaced apart from the first conveyor by a transition;
  (c) determining a shape of at least one side of the belt strip as it passes over the transition;
  (d) comparing the determined shape of the at least one side with a shape of a stored reference belt strip;
  (e) shifting the belt strip relative to the building drum in a direction transverse to the direction of conveyance in response to the comparison; and
  (f) fixing that portion of the belt strip which has passed over the transition, onto the building drum, wherein steps (c)–(f) are carried out substantially concurrently as the belt strip passes over the transition.

17. The method of claim 16, wherein the step of shifting the belt strip is carried out by shifting the entire first conveyor in a direction transverse to the direction of conveyance.

18. The method of claim 16, further comprising the step of:
  reducing the velocity of the belt strip to a second velocity lower than said first velocity during the steps of determining, comparing and shifting, said second velocity being greater than zero.

19. The method of claim 16 wherein the belt strip has a substantially parallelogram shape comprising:
  a substantially triangular leading end having a leading hypotenuse and a leading short side;
  a substantially rectangular central part having a first long side which is an extension of said leading short side, and a second long side parallel to said first long side, one end of said central part being attached to said leading end; and
  a substantially triangular trailing end formed with a trailing hypotenuse and a trailing short side, said trailing short side being an extension of said second long side, said trailing end attached to a second end of said central part,
  said leading and trailing hypotenuses being formed at substantially the same angle relative to respective said leading and trailing short sides.

20. The method of claim 19, wherein a shape of at least one of said leading hypotenuse and said trailing hypotenuse is determined and then compared with a corresponding shape of at least one of a reference leading hypotenuse and a reference trailing hypotenuse.

21. The method of claim 19, wherein a shape of at least one of said leading short side and said trailing short side is determined and then compared with a corresponding shape of at least one of a reference leading short side and a reference trailing short side.

22. The method of claim 19, including the steps of:
  determining a width, and a middle, of the central part based on positions of the first and second long sides, as the central part passes over the transition;
  comparing said middle with a reference center line based on a reference width; and
  shifting the belt strip in a direction transverse to the direction of conveyance, and by a distance sufficient to have the middle of its central part coincide with said reference center line.

23. The method of claim 22, wherein the reference width is an average width of a central part of a preceding belt strip.

24. The method of claim 19, including the steps of:
  determining a shape of at least one of said leading short side and said leading hypotenuse, as the leading end passes over said transition; and
  comparing said determined shape with a corresponding shape of at least one of a reference leading short side and a reference leading hypotenuse.

25. The method of claim 24, further comprising the steps of:
  determining a width, and a middle, of the central part based on positions of the first and second long sides, as the central part passes over the transition; and
  comparing said middle with a reference center line based on a reference width.

26. The method of claim 25, further comprising the steps of:
  determining a shape of at least one of said trailing short side and said trailing hypotenuse, as the trailing end passes over the transition; and
  comparing said determined shape with a corresponding shape of at least one of a reference trailing short side and a reference trailing hypotenuse.

27. The method of claim 26, further comprising the step of:
  comparing, for a rear part of said central part, a portion of said second long side belonging to said rear part, with a corresponding portion of a reference second long side, before determining a shape of said trailing short side.

28. The method of claim 26, further comprising the step of:
  comparing a first portion of said trailing short side, with a corresponding first portion of a reference trailing short side, before determining a shape of said hypotenuse.

29. The method of claim 26, wherein a width of the belt strip is measured every 1.5 mm as it passes over said transition.

30. The method of claim 19, further comprising the steps of:
  determining and storing a width of the leading end as it passes over the transition, said width being defined between the leading short side and the leading hypotenuse, comparing said determined width with a stored, reference width from an immediately preceding portion of said leading end, and detecting when said central part begins passing over the transition based on a variation in said determined width.

31. A method for adjusting a belt strip as it passes from a first conveyor to one of a second conveyor and a building drum spaced apart from the first conveyor by a transition, said method comprising the steps of:

(a) cutting a belt strip from a supply of belt material, said belt strip having a substantially parallelogram shape comprising:

a substantially triangular leading end having a leading hypotenuse and a leading short side;

a substantially rectangular central part having a first long side which is an extension of said leading short side, and a second long side parallel to said first long side, one end of said central part being attached to said leading end; and a substantially triangular trailing end formed with a trailing hypotenuse and a trailing short side, said trailing short side being an extension of said second long side, said trailing end attached to a second end of said central part, said leading and trailing hypotenuses being formed at substantially the same angle relative to respective said leading and trailing short sides;

(b) conveying the belt strip on the first conveyor and at a first velocity towards said one of a second conveyor and a building drum;

(c) determining a center of a first portion of the belt strip as it passes over the transition;

(d) comparing the determined center of said first portion with a reference center of a corresponding portion of a reference belt strip;

(e) shifting the belt strip relative to, said one of a second conveyor and a building drum, in a direction transverse to the direction of conveyance in response to the comparison such that the determined center coincides with said reference center;

(f) fixing said first portion of the belt strip onto said one of a second conveyor and a building drum, after said first portion has passed over the transition; and (g) repeating steps (c)–(f) for subsequent portions of the belt strip as they pass over the transition.

* * * * *